(12) United States Patent
Gama-Valdez et al.

(10) Patent No.: US 9,845,148 B2
(45) Date of Patent: Dec. 19, 2017

(54) AIRCRAFT LANDING GEAR LONGITUDINAL FORCE CONTROL

(71) Applicants: AIRBUS OPERATIONS LIMITED, Bristol (GB); AIRBUS OPERATIONS SAS, Toulouse (FR)

(72) Inventors: Miguel Angel Gama-Valdez, Bristol (GB); Louis-Emmanuel Romana, Toulouse (FR); Andrea Damiani, Bristol (GB)

(73) Assignees: Airbus Operations Limited, Bristol (GB); Airbus Operations SAS, Toulouse (FR)

( * ) Notice: Subject to any disclaimer, the term of this patent is extended or adjusted under 35 U.S.C. 154(b) by 193 days.

(21) Appl. No.: 14/443,282

(22) PCT Filed: Nov. 15, 2013

(86) PCT No.: PCT/GB2013/053012
§ 371 (c)(1),
(2) Date: May 15, 2015

(87) PCT Pub. No.: WO2014/076485
PCT Pub. Date: May 22, 2014

(65) Prior Publication Data
US 2016/0355256 A1    Dec. 8, 2016

(30) Foreign Application Priority Data

Nov. 16, 2012   (GB) .................................... 1220616.5

(51) Int. Cl.
*B64C 25/00* (2006.01)
*B64C 25/40* (2006.01)
(Continued)

(52) U.S. Cl.
CPC .......... *B64C 25/405* (2013.01); *B60T 8/1703* (2013.01); *B60T 8/1766* (2013.01); *B64C 25/426* (2013.01); *Y02T 50/823* (2013.01)

(58) Field of Classification Search
CPC ......... B64C 25/00; B64C 25/10; B64C 25/18; B64C 25/26
(Continued)

(56) References Cited

U.S. PATENT DOCUMENTS

| 4,043,607 A | 8/1977 | Signorelli et al. |
| 5,390,990 A | 2/1995 | Cook et al. |

(Continued)

FOREIGN PATENT DOCUMENTS

| CN | 101204953 | 6/2008 |
| CN | 101941524 | 1/2011 |

(Continued)

OTHER PUBLICATIONS

Chinese Office Action issued in CN 201380070681.2, dated May 3, 2016, 14 pages.
(Continued)

*Primary Examiner* — Thomas G Black
*Assistant Examiner* — Wae Louie
(74) *Attorney, Agent, or Firm* — Nixon & Vanderhye P.C.

(57) ABSTRACT

An aircraft landing gear longitudinal force control system for an aircraft having landing gears with braking and/or driving wheel(s). The system includes an error-based force controller having feedback for minimising any error between the demanded force and the actual force achieved by the force control system. The feedback may be derived from force sensors on the landing gear for direct measurement of the landing gear longitudinal force. The force control system may include an aircraft level landing gear
(Continued)

total force controller and/or a landing gear level force controller for each actuated landing gear.

25 Claims, 3 Drawing Sheets

(51) Int. Cl.
*B60T 8/17* (2006.01)
*B60T 8/1766* (2006.01)
*B64C 25/42* (2006.01)

(58) Field of Classification Search
USPC ...... 701/13, 33.3, 70, 15, 16; 188/71.1, 382; 244/183
See application file for complete search history.

(56) References Cited

U.S. PATENT DOCUMENTS

| | | | | |
|---|---|---|---|---|
| 8,584,989 | B2* | 11/2013 | Lemay | G05D 1/0083 188/382 |
| 2003/0020326 | A1 | 1/2003 | Salamat et al. | |
| 2005/0001474 | A1 | 1/2005 | Zierolf | |
| 2012/0018574 | A1 | 1/2012 | Bayer | |
| 2015/0301531 | A1* | 10/2015 | Gama-Valdez | B60T 8/1703 701/3 |
| 2016/0355256 | A1* | 12/2016 | Gama-Valdez | B60T 8/1703 |

FOREIGN PATENT DOCUMENTS

| | | |
|---|---|---|
| CN | 202244077 | 5/2012 |
| EP | 0 601 681 | 6/1994 |
| EP | 1 826 081 | 8/2007 |
| GB | 2 437 042 | 10/2007 |
| WO | WO 01/36240 | 5/2001 |

OTHER PUBLICATIONS

International Search Report for PCT/GB2013/053012, dated Mar. 5, 2014, 5 pages.
Written Opinion of the ISA for PCT/GB2013/053012, dated Mar. 5, 2014, 6 pages.
Search Report for GB 1220616.5 dated Mar. 7, 2013, 1 page.

* cited by examiner

AIRCRAFT LANDING GEAR LONGITUDINAL FORCE CONTROL

This application is the U.S. national phase of International Application No. PCT/GB2013/053012 filed Nov. 15, 2013, which designated the U.S. and claims priority to GB 1220616.5 filed Nov. 16, 2012, the entire contents of each of which applications are hereby incorporated by reference.

FIELD OF THE INVENTION

The present invention relates to a system for controlling forces in the aircraft longitudinal (forward-aft) direction produced by the aircraft's landing gears equipped with braking and/or driving wheels.

BACKGROUND OF THE INVENTION

A typical aircraft has landing gear comprising a plurality of wheeled landing gear assemblies which support the aircraft when it is on the ground. The landing gear assemblies are used to control the movement of the aircraft during ground manoeuvres such as landing, taxiing and take off. A typical large jet-powered aircraft includes a steerable nose landing gear (NLG) assembly located towards the front of the fuselage and a plurality of main landing gear (MLG) assemblies (also known as bogies) located rearwards of the NLG assembly and distributed laterally about the aircraft longitudinal axis. The MLG assemblies typically each include one or more actuators which are operable to provide a braking force and/or driving force to decelerate and/or accelerate, respectively, the wheels of that MLG assembly.

The movement of such an aircraft on the ground, e.g. during ground taxi manoeuvres, is determined by control commands issued from the cockpit. To achieve these control commands, the landing gear is required to achieve a particular longitudinal force demand. The present invention is concerned with the control of the wheel braking and/or driving actuators to achieve those demands.

SUMMARY OF THE INVENTION

A first aspect of the invention provides a landing gear force control system for an aircraft having a longitudinal axis and a plurality of landing gears having one or more braking and/or driving wheels, the force control system comprising an error-based force control module adapted to: receive an input signal representative of a longitudinal force demand to be achieved by the force control system; receive an input signal representative of an actual measured longitudinal force acting upon one or more landing gears; calculate any error between the force demand signal and the actual force signal; and output a longitudinal force command for the one or more landing gears so as to minimise any error between the demanded force and the actual force.

A further aspect of the invention provides a method for directly controlling force produced by one or more aircraft landing gears equipped with braking and/or driving wheels, the method comprising: receiving an input signal representative of a longitudinal force demand to be achieved by one or more landing gears; measuring force in the aircraft longitudinal direction acting upon one or more landing gears; calculating any error between the demanded force and the actual force; and outputting a corrected longitudinal force command for the one or more landing gears so as to minimise any error between the demanded force and the actual force.

The invention is advantageous in that it enables overall direct control of the longitudinal force produced by the landing gear(s) and transferred to the rest of the aircraft independently of all other forces applied to the aircraft, e.g. engine thrust, wing loads. The error-based force control module aims to ensure that braking or driving forces at the one or more landing gears correctly achieve the longitudinal force demands.

The output longitudinal force command can be at the global landing gear level for all of the landing gears of the aircraft, or at the landing gear level for each landing gear individually. Preferably the system includes a global landing gear level force controller and a plurality of respective landing gear force controllers for each landing gear.

The term longitudinal is used here to refer to a direction along the forward-aft longitudinal axis, or roll axis, of the aircraft.

Measurement of the longitudinal force acting upon the one or more landing gears facilitates effective un-commanded force rejection to account for disturbances or perturbations from external or internal factors, e.g. due to changing runway conditions, changing steering angle, actuator failure or any other source of uncertainty.

The error-based force control module may be further adapted to: estimate the longitudinal force being achieved by the force control system based upon the longitudinal force command and known characteristics of the landing gear braking and/or driving wheel systems; and augment, or replace, the actual measured longitudinal force with the estimated longitudinal force for use in the error calculation.

Whilst direct measurement of the landing gear longitudinal force, e.g. using a force sensor, is preferable for accurate closed-loop control of the landing gear longitudinal force, it is advantageous that the force control system is continuously operable through open-loop control, or a combination of open- and closed-loop control. The signal representative of an actual measured longitudinal force being achieved by the force control system may therefore be either a direct measurement of the landing gear force using force sensors, or the like, or alternatively may be an estimation based upon predefined knowledge of the landing gear components and actuators. The error calculation based upon the actual measured longitudinal force may be amplitude limited, i.e. reduced feedback, in order to augment control system failure tolerance.

The error-based force control module may include a landing gear total force controller associated with all of the landing gears of the aircraft. The landing gear total force controller may be configured to: receive an input signal representative of a landing gear total longitudinal force demand to be achieved by the force control system; receive an input signal representative of an actual measured longitudinal force acting upon all of the landing gears; calculate any error between the force demand signal and the actual force signal; and output a landing gear total longitudinal force command to be achieved by the force control system so as to minimise any error between the demanded force and the actual force.

By controlling the landing gear total force it is possible to account for the level of longitudinal drag that is being produced, e.g. by a nose landing gear (without braking or driving wheels) due to drag forces acting on the gear. Of course, in some aircraft the nose landing gear may include braking or driving wheels.

The error-based force control module may include a summation block configured to receive an input signal representative of an actual measured longitudinal force acting upon each of the landing gears, and to output a signal to the total force controller representative of an actual measured longitudinal force being achieved for all of the landing gears.

The error-based force control module may include one or more landing gear force controllers each associated with a respective one of the landing gears equipped with braking and/or driving wheel(s). Each landing gear force controller may be configured to: receive an input signal representative of a landing gear longitudinal force demand to be achieved by the force control system for that landing gear; receive an input signal representative of an actual measured landing gear longitudinal force being achieved by the force control system for that landing gear; calculate any error between the force demand signal and the actual force signal; and output a landing gear longitudinal force command for that landing gear so as to minimise any error between the demanded force and the actual force.

Each landing gear force controller may be further adapted to limit the landing gear longitudinal force demand for its landing gear to within safe structural limits, so as to provide loads limitation for that landing gear. The force control system may be arranged to allow a common torque rise rate limitation for the braking wheels that best meets the desired braking performance within the landing gear load constraints. The improved control and robustness supports effective landing gear loads limitation, as commands can be limited based on structural constraints. This is a significant step forward from current torque rise limiters which are based upon brake pressure rise rate set according to the maximum brake gain, which in practice is rarely achieved.

Each landing gear force controller may include an actuator gain estimator for its landing gear, and wherein the force controller output based upon the actual measured longitudinal force is limited based upon the estimated actuator gain.

The force control module may further comprises a force distributor for dividing a total longitudinal force demand to be achieved by the force control system into a plurality of force components to be achieved by the respective landing gears equipped with braking and/or driving wheels. The longitudinal force distribution may be used to minimize undesired yaw moments by balancing the longitudinal forces either side of the aircraft centreline.

The force control system may further comprise a configuration manager for providing configuration data to the force control module. The configuration manager may be arranged to receive one or more signals from effectors and/or sensors, and the configuration manager may be adapted to generate the configuration data based upon the signals from the effector(s) and/or sensor(s).

The configuration manager may be arranged to receive one or more signals representative of operational scenario(s) and/or parameter(s) of the aircraft, and the configuration manager may be adapted to generate the configuration data based upon the aircraft parameter(s) and/or operational scenario(s).

The configuration manager may be arranged to provide the configuration data to the force control module so as to reconfigure the force control module without disrupting its continuous operation. This reconfiguring may be used to account for a change of status of one or more effector(s) and/or sensor(s) and/or operational scenario(s) and/or parameter(s) of the aircraft. This configuration data may cause, e.g. a change from open-loop to closed-loop control of the system. The configuration data for effectors may include, e.g. controller gains; the operational scenarios may include, e.g. a rejected take-off; and the aircraft parameters may include, e.g. aircraft speed.

The configuration manager may be used to achieve maximum braking retardation of the aircraft during a rejected take-off (RTO) whilst reducing the level of energy dissipated into the brakes. For example, using current technologies the braking level during RTO is limited to avoid wheel brake anti-skid operation in dry conditions. This invention enables the braking force to be closed-loop controlled such that a higher level of braking force may be applied at lower speed allowing more energy to be dissipated by the aircraft aerodynamic loads at higher speed.

The force control system may further comprise a fitness evaluation module for evaluating the fitness and/or reliability of one or more signals destined for the configuration manager, and outputting status data for the signal(s) to the configuration manager.

The force control system is preferably incorporated in an aircraft having a longitudinal axis and a plurality of landing gears having one or more braking and/or driving wheels.

Each landing gear preferably includes at least one sensor for measuring force in the aircraft longitudinal direction acting upon the landing gear.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
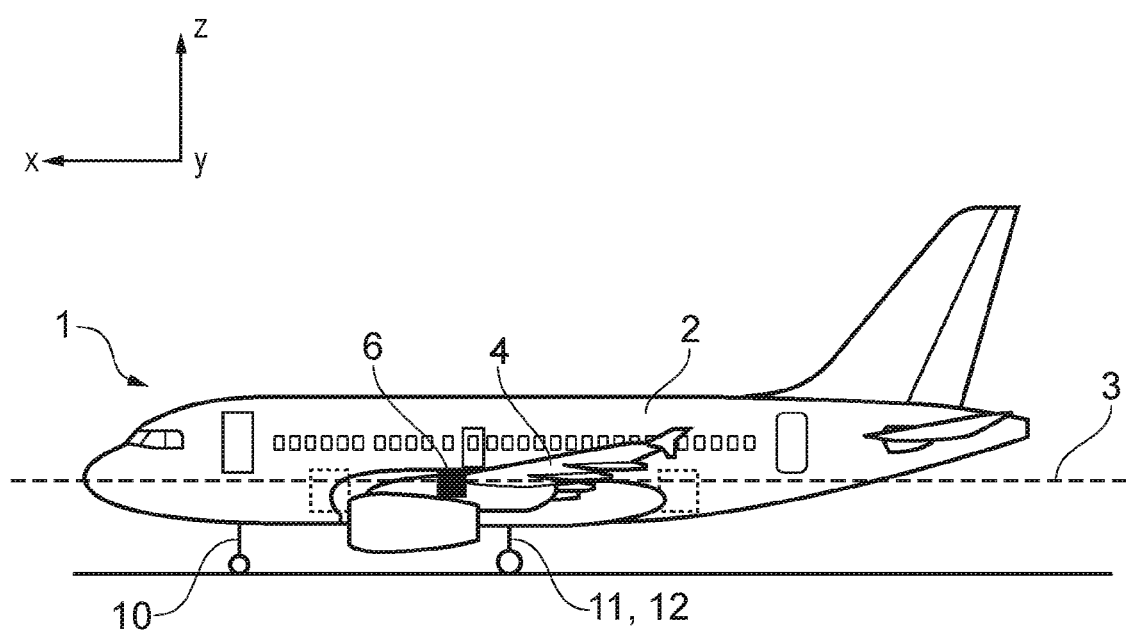
FIGS. 1a and 1b illustrate schematic side and plan views, respectively, of an aircraft.
Figure 1B:
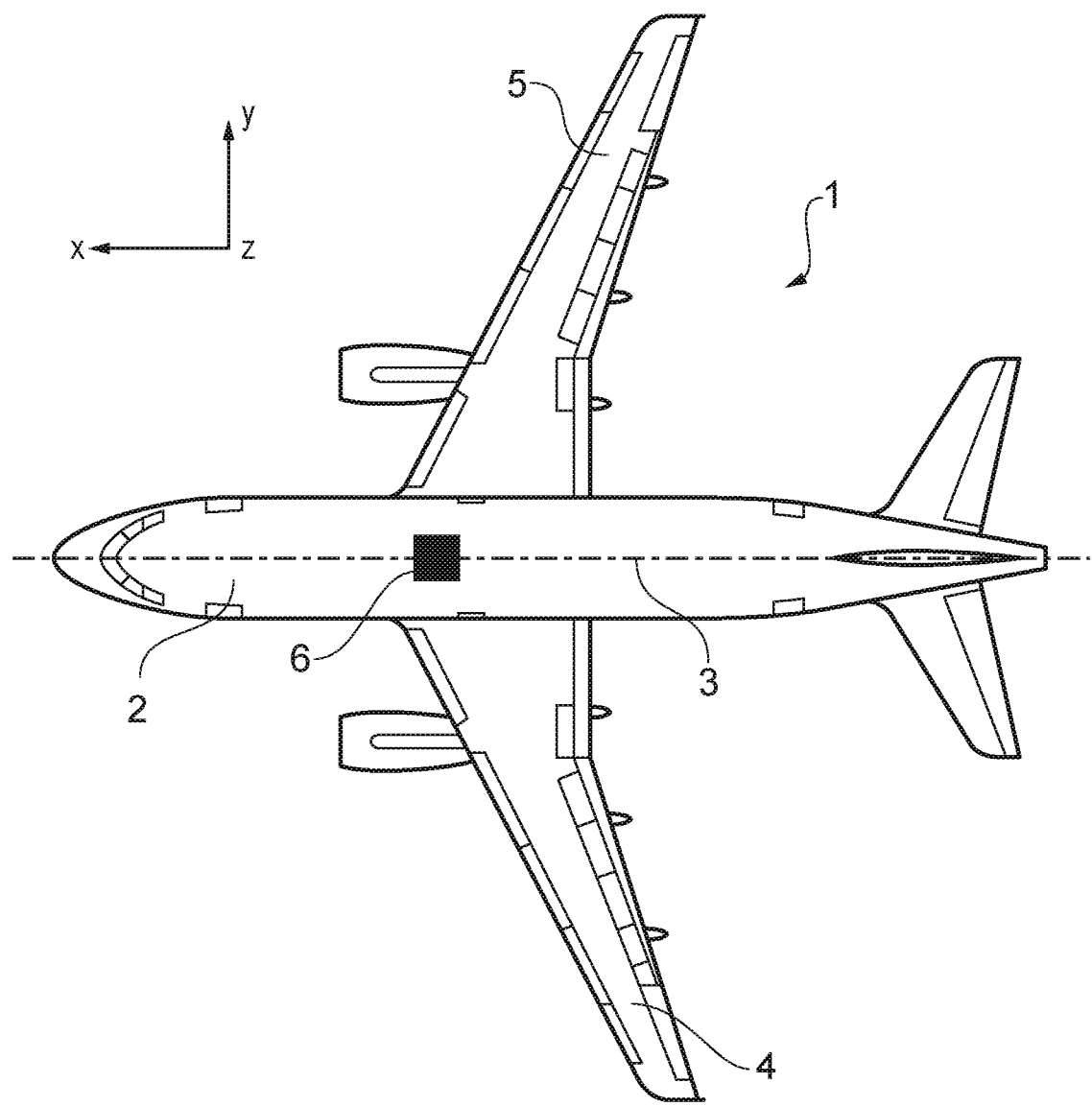

FIGS. 1a and 1b show an aircraft 1 having a fuselage 2 with a longitudinal axis 3 (also known as a roll axis) and wings 4, 5 extending outwardly from the fuselage. The aircraft 1 defines a set of axes with a longitudinal x direction parallel to the longitudinal axis 3 of the aircraft, a lateral y direction perpendicular to the x axis, and a vertical z direction perpendicular to the x and y axes. The aircraft 1 has a centre of gravity 6.

The aircraft has landing gear which supports the aircraft when it is on the ground and controls the movement of the aircraft during ground manoeuvres such as landing, taxiing and take off. The landing gear comprises a nose landing gear (NLG) assembly 10 forward of the centre of gravity 6, and a pair of port and starboard main landing gear (MLG) assemblies 11, 12 aft of the centre of gravity 6 and arranged either side of the longitudinal axis 3. In other embodiments, the aircraft may comprise one or more further MLG assemblies, typically arranged in pairs and located either side of the longitudinal axis 3. The landing gear is usually retracted when the aircraft 1 is in flight, and extended before landing.

The NLG assembly 10 has a pair of steering wheels which may be rotated by a steering actuator to steer the aircraft. The nose wheel angle is defined as the angle between the direction in which the steering wheels are facing (that is the direction in which the wheels roll in a direction perpendicular to the axis of rotation) and the longitudinal axis 3 of the aircraft 1. The nose wheel angle may be varied to control the direction of travel of the NLG assembly 10, thereby controlling the heading of the aircraft.

The MLG assemblies 11, 12 each comprise a 4-wheeled bogie (alternatively, a 6-wheeled bogie or bogie with any number of wheels may be suitable) with an actuator (not shown) capable of acting on one or more of the wheels to accelerate or decelerate the bogie. The actuator may comprise a brake actuator which applies a clamping force to a stack of carbon brake disks (stators and rotors) to transfer a braking torque to the one or more wheels, resulting in a longitudinal deceleration force being transferred to the bogie. Alternatively, or in addition, the actuator may comprise a motor/generator operable to apply a driving/retarding force to the one or more wheels to result in application of a longitudinal acceleration/deceleration force being transferred to the bogie.

The actuators of the MLG assemblies 11, 12 may be used to help steer the aircraft via differential braking, which is the intentional application of unbalanced braking forces either side of the aircraft centre line 3 to generate a net yaw moment to steer the aircraft. Differential braking may be achieved by applying different braking forces to each of the bogies of the MLG assemblies 11, 12.

Braking and steering operations may also be assisted by other systems, for example spoilers and other control surfaces and the aircraft's engines.

The aircraft 1 includes a cockpit system (not shown) for longitudinal control which is used to control deceleration or acceleration of the aircraft and which outputs a signal representative of a desired braking or driving force along the longitudinal x axis 3 that is to be achieved by the landing gear, i.e. a longitudinal force input demand, $Fx^*$.

Each landing gear (LG) 10, 11, 12 has at least one sensor, e.g. a force sensor (not shown), for measuring force in the longitudinal direction acting upon each LG. The output derived from the sensors is a vector (of size 1×n, where n represents the number of LG assemblies, in this case three) of longitudinal force, $Fx\_LG$, acting upon the LG assemblies. The sum of the longitudinal force vectors is a scalar of the total measured longitudinal force acting on the LG assemblies, $Fx$.

Figure 2:
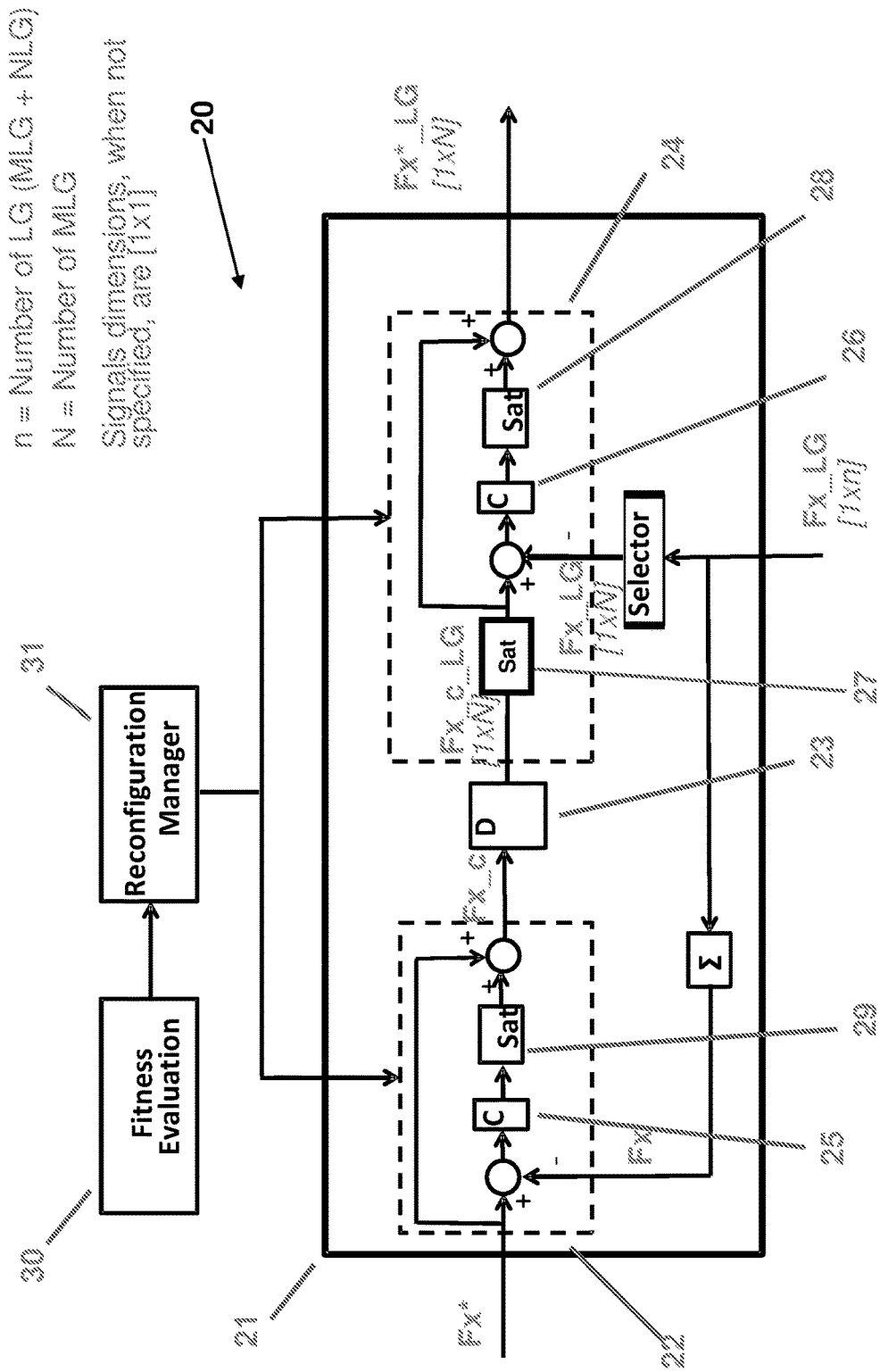
FIG. 2 illustrates a force control system according to an embodiment of the invention.

FIG. 2 shows a landing gear force control system 20 of the aircraft according to an embodiment of the invention. The system includes a force controller 21 which receives the scalar input of total longitudinal force input demand, $Fx^*$, to be achieved at aircraft landing gear level, and determines the braking and/or driving forces to be applied to each of the MLG assemblies 11, 12 in order to achieve those demands. The output of the force controller 21 is a vector (of size 1×N, where N represents the number of MLG assemblies, in this case two) of longitudinal force commands, $F^*\_LG$, which comprises a longitudinal braking or driving force to be applied to each MLG assembly, respectively.

The controller 21 includes an aircraft landing gear level total force control module 22. The total force control module 22 has an error-based PI controller 25 which receives the total longitudinal force input demand $Fx^*$ and, via a feedback loop, the total measured longitudinal force acting on the LG assemblies, $Fx$. The output $Fx\_c$ of the total force control module 22 is equal to the summation of the total longitudinal force demand $Fx^*$ and a feedback correction dependent on the error between $Fx^*$ and the total measured longitudinal force $Fx$.

The feedback correction is limited by a saturator 29, whose upper and lower limits are tuned in order to prevent excessive disruptions caused by undetected sensor malfunctions, but without compromising the effective compensation of uncertain internal and external perturbations, such as actuator gain variations and the presence of NLG longitudinal drag force.

The corrected aircraft landing gear total longitudinal force demand $Fx\_c$ enters a distributor module 23 which outputs the vector $Fx\_c\_LG$ of longitudinal force demands for each actuated landing gear, i.e. landing gears equipped with braking and/or driving wheels, which in this example are the MLG assemblies 11, 12. The distributor 23 may be designed to limit these demands using a saturator 27, within landing gear structural limits, and hence in combination with the landing gear level controller 24 (described below) provides effective loads limitation for each landing gear.

The controller 21 also includes an landing gear level force control module 24. The landing gear force control module 24 has an error-based PI controller 26 which receives the vector of longitudinal force demands $Fx\_c\_LG$ for each actuated landing gear from distributor 23 and, via a feedback loop, the vector of measured longitudinal force acting on the MLG assemblies, $Fx\_LG$. The vector $Fx\_LG$ for the MLG assemblies (of size 1×N) is selected from the vector $Fx\_LG$ for all LG (of size 1×n) by a selector. The output $Fx^*\_LG$ of the landing gear force control module 24 is a vector containing the longitudinal force commands for each actuated landing gear. Each component is equal to the summation of the respective landing gear force demand and a feedback correction dependent on the error between the landing gear force demand $Fx\_c\_LG$ and the measured landing gear force $Fx\_LG$.

The feedback correction is limited by a saturator 28, whose upper and lower limits are tuned in order to prevent excessive disruptions caused by undetected sensors malfunctions, but without compromising the effective compensation of uncertain internal and external perturbations, such as actuator gain variations and the presence of NLG longitudinal drag force.

The output longitudinal force commands for each actuated landing gear in the vector $FX^*\_LG$ may be either positive or negative. A negative value is indicative of an deceleration command for braking wheels (e.g. conventional carbon brakes, regenerative brakes, or motorised brakes). A positive value is indicative of an acceleration command for the driving wheels (e.g. wheel motors). Some aircraft will not have driving wheels, only braking wheels, in which case the value will always be negative.

A fitness evaluation module 30 provides Boolean values associated with the status of sensors and actuators/effectors, e.g. the landing gear force sensors and the wheel brake actuators or wheel motors/generators. This status information may include for example the type(s) of actuator available, the operational status of that actuator, the health, i.e. fitness, of the actuator, etc. These values are received by a reconfiguration manager 31 which manages the aircraft landing gear force controller 21 functionalities based on fitness signals and/or operational scenarios. For example, the reconfiguration manager 31 can receive information concerning runway conditions, operational scenarios, or any other structural, operational or system constraints.

The reconfiguration manager 31 is operable to modify the gains and parameters of controllers 25, 26, saturators 27, 28, 29, and the activation of the feedback corrections in the aircraft landing gear level total force controller 22 and the landing gear level force controllers 26. For example, if the reconfiguration manager 31 judges that the measured longitudinal force $Fx\_LG$ output by a particular force sensor is unreliable or is unavailable then the feedback corrections in controllers 22 and 26 may be partially or fully based upon an estimated value of the longitudinal force $Fx\_LG$. In this mode of operation the error-based feedback is open-loop, rather than closed-loop, or may be a combination of both.

The estimated value for Fx_LG may be derived from predetermined characteristics of the actuators, such as brake gain, position sensors, or the like.

Although the invention has been described above with reference to one or more preferred embodiments, it will be appreciated that various changes or modifications may be made without departing from the scope of the invention as defined in the appended claims.

The invention claimed is:

1. A landing gear force control system for an aircraft having a longitudinal axis and a plurality of landing gears having one or more braking and/or driving wheels, the force control system is operative at landing gear level and comprises an error-based force control module adapted to:
receive an input signal representative of a longitudinal force demand to be achieved by the force control system;
receive an input signal representative of an actual measure of all longitudinal force acting upon one or more landing gears;
calculate any error between the force demand signal and the actual force signal; and
output a longitudinal force command for the one or more landing gears so as to minimize any error between the demanded force and the actual force.

2. The force control system according to claim 1, wherein the error-based force control module is further adapted to:
estimate the longitudinal force being achieved by the force control system based upon the longitudinal force command and known characteristics of the landing gear braking and/or driving wheel systems; and
augment, or replace, the actual measured longitudinal force with the estimated longitudinal force for use in the error calculation.

3. The force control system according to claim 2, wherein the error calculation based upon the actual measured longitudinal force is amplitude limited.

4. The force control system according to claim 1, wherein the error-based force control module includes a landing gear total force controller associated with all of the landing gears of the aircraft and being configured to:
receive an input signal representative of a landing gear total longitudinal force demand to be achieved by the force control system;
receive an input signal representative of an actual measured longitudinal force acting upon all of the landing gears;
calculate any error between the force demand signal and the actual force signal; and
output a landing gear total longitudinal force command to be achieved by the force control system so as to minimize any error between the demanded force and the actual force.

5. The force control system according to claim 4, wherein the error-based force control module includes a summation block configured to receive an input signal representative of an actual measured longitudinal force acting upon each of the landing gears, and to output a signal to the total force controller representative of an actual measured longitudinal force being achieved for all of the landing gears.

6. The force control system according to claim 1, wherein the error-based force control module includes one or more landing gear force controllers each associated with a respective one of the landing gears equipped with braking and/or driving wheel(s), each landing gear force controller being configured to:
receive an input signal representative of a landing gear longitudinal force demand to be achieved by the force control system for that landing gear;
receive an input signal representative of an actual measured landing gear longitudinal force being achieved by the force control system for that landing gear;
calculate any error between the force demand signal and the actual force signal; and
output a landing gear longitudinal force command for that landing gear so as to minimize any error between the demanded force and the actual force.

7. The force control system according to claim 6, wherein each landing gear force controller is further adapted to limit the landing gear longitudinal force demand for its landing gear to within safe structural limits, so as to provide loads limitation for that landing gear.

8. The force control system according to claim 6, wherein each landing gear force controller includes an actuator gain estimator for its landing gear, and wherein the force controller output based upon the actual measured longitudinal force is limited based upon the estimated actuator gain.

9. The force control system according to claim 1, wherein the force control module further comprises a force distributor for dividing a total longitudinal force demand to be achieved by the force control system into a plurality of force components to be achieved by the respective landing gears equipped with braking and/or driving wheels.

10. The force control system according to claim 1, further comprising a configuration manager for providing configuration data to the force control module.

11. The force control system according to claim 10, wherein the configuration manager is arranged to receive one or more signals from effectors and/or sensors, and the configuration manager is adapted to generate the configuration data based upon the signals from the effector(s) and/or sensor(s).

12. The force control system according to claim 10, wherein the configuration manager is arranged to receive one or more signals representative of operational scenario(s) and/or parameter(s) of the aircraft, and the configuration manager is adapted to generate the configuration data based upon the aircraft parameter(s) and/or operational scenario(s).

13. The force control system according to claim 10, wherein the configuration manager is arranged to provide the configuration data to the force control module so as to reconfigure the force control module without disrupting its continuous operation.

14. The force control system according to claim 10, further comprising a fitness evaluation module for evaluating the fitness and/or reliability of one or more signals destined for the configuration manager, and outputting status data for the signal(s) to the configuration manager.

15. An aircraft having a longitudinal axis and a plurality of landing gears having one or more braking and/or driving wheels, and the force control system recited in claim 1.

16. The aircraft according to claim 15, wherein each landing gear includes at least one sensor for measuring force in the aircraft longitudinal direction acting upon the landing gear.

17. A method for directly controlling at a landing gear level a force produced by one or more aircraft landing gears equipped with braking and/or driving wheels, the method comprising:
receiving an input signal representative of a longitudinal force demand to be achieved by one or more landing gears;

measuring all forces in the aircraft longitudinal direction acting upon one or more landing gears;

calculating any error between the demanded force and the actual force; and outputting a corrected longitudinal force command for the one or more landing gears so as to minimize any error between the demanded force and the actual force.

18. The method according to claim 17, further comprising estimating the longitudinal force based upon the longitudinal force command and known characteristics of the landing gear braking and/or driving wheel systems; and augmenting, or replacing, the actual measured longitudinal force with the estimated longitudinal force for use in the error calculation.

19. The method according to claim 17, further comprising:

receiving an input signal representative of a total longitudinal force demand to be achieved by all of the aircraft landing gears;

receiving an input signal representative of an actual measured longitudinal force being achieved by all of the aircraft landing gears;

calculating any error between the force demand signal and the actual force signal; and outputting a corrected total longitudinal force command so as to minimise any error between the demanded force and the actual force.

20. The method according to claim 17, further comprising, for each landing gear equipped with braking and/or driving wheels:

receiving an input signal representative of a landing gear longitudinal force demand to be achieved by that landing gear;

receiving an input signal representative of an actual measured landing gear longitudinal force being achieved by that landing gear;

calculating any error between the force demand signal and the actual force signal; and outputting a corrected landing gear longitudinal force command for that landing gear so as to minimize any error between the demanded force and the actual force.

21. The method according to claim 20, further comprising limiting the landing gear longitudinal force demand for its landing gear to within safe structural limits, so as to provide loads limitation for that landing gear.

22. The method according to claim 17, further comprising distributing a total longitudinal force demand into a plurality of force components to be achieved by the respective landing gears equipped with braking and/or driving wheels.

23. The method according to claim 22, wherein the longitudinal force distribution minimizes undesired yaw moments by balancing the longitudinal forces either side of the aircraft centerline.

24. The method according to a claim 17, further comprising reconfiguring the longitudinal force control without disrupting its continuous operation.

25. The method according to claim 24, wherein the reconfiguring is to account for a change of status of one or more effector(s) and/or sensor(s) and/or operational scenario(s) and/or parameter(s) of the aircraft.

* * * * *